(12) United States Patent
Gonzalez

(10) Patent No.: US 7,349,898 B2
(45) Date of Patent: Mar. 25, 2008

(54) APPROXIMATE AND EXACT UNARY INCLUSION DEPENDENCY DISCOVERY

(75) Inventor: Zandro Luis Gonzalez, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 364 days.

(21) Appl. No.: 10/861,298

(22) Filed: Jun. 4, 2004

(65) Prior Publication Data

US 2005/0278355 A1  Dec. 15, 2005

(51) Int. Cl.
*G06F 7/00* (2006.01)
*G06F 17/30* (2006.01)
*G06F 17/00* (2006.01)

(52) U.S. Cl. .......................... 707/4; 707/100

(58) Field of Classification Search .............. 707/3, 707/4, 100, 200; 711/1–6, 200
See application file for complete search history.

(56) References Cited

U.S. PATENT DOCUMENTS

| | | | |
|---|---|---|---|
| 6,496,819 B1 * | 12/2002 | Bello et al. ................. | 707/3 |
| 6,615,206 B1 * | 9/2003 | Jakobsson et al. .......... | 707/3 |
| 7,007,032 B1 * | 2/2006 | Chen et al. ................. | 707/101 |
| 2005/0097072 A1 * | 5/2005 | Brown et al. .............. | 707/1 |
| 2005/0102325 A1 * | 5/2005 | Gould et al. ............... | 707/104.1 |
| 2005/0240615 A1 * | 10/2005 | Barsness et al. ............ | 707/102 |

OTHER PUBLICATIONS

Y. Huhtala, et al., "TANE: An Efficient Algorithm for Discovering Functional and Approximate Dependencies", The Computer Journal vol. 42, No. 2, 1999, pp. 100-111.
S. Bell and P. Brockhausen, "Discovery of Data Dependencies in Relational Databases", *Statistics, Machine Learning and Knowledge Discovery in Databases*, ed. Yves Kodratoff, et al., Apr. 1995, pp. 53-58, ML—Familiarization Workshop.

* cited by examiner

*Primary Examiner*—Apu Mofiz
*Assistant Examiner*—Jared M Bibbee
(74) *Attorney, Agent, or Firm*—Hickman Palermo Truong & Becker LLP (57) ABSTRACT

A method and apparatus for analyzing potential inclusion dependencies between columns of database tables is provided. A client issues a command, e.g., a SQL statement, to a database server. The command is processed at the database server without the performance of a join. Result data that indicates any exact inclusion dependencies or approximate inclusion dependencies between columns of database tables identified in the command is transmitted from the database server to the client. In processing the command, values stored in columns of database tables are converted into integer representations that require fewer resources to analyze. Disclosed techniques provide for the use of an index on a single database table rather than defining an index on each database table, which can be impractical. Further, the performance of only one pass on the data is required to identify any inclusion dependencies between columns of database tables.

22 Claims, 4 Drawing Sheets

APPROXIMATE AND EXACT UNARY INCLUSION DEPENDENCY DISCOVERY

FIELD OF THE INVENTION

The present invention relates to discovering approximate and exact unary inclusion dependencies between columns of database tables.

BACKGROUND

A column of a database table may have an inclusion dependency with another column of the same database table or another database table. An exact inclusion dependency between column A and column B (expressed as A $\subseteq$ B) exists if each and every value in column A is also in column B. For example, if values in column X are foreign key values that uniquely identify values within column Y, then column X is said to have an inclusion dependency with column Y since each value in column X is in column Y.

On the other hand, an approximate inclusion dependency exists between column A and column B if some, but not all, of the values in column A are also in column B. Current methods for detecting inclusion dependency relationships within data sets are largely directed towards identifying exact inclusion dependency relationships, although identifying approximate inclusion dependency relationships within a data set also yields useful information about the data set.

The identification of exact inclusion dependencies and approximate inclusion dependencies that exist between columns of tables stored in a database may be desirable for a variety of reasons. The identification of inclusion dependencies facilitates the job of a database administrator to ensure the quality and consistency of the data stored in the database. Additionally, the identification of inclusion dependencies is a central task in data profiling.

Typically, to identify whether any inclusion dependencies exist between columns of database tables, a join must be performed on every combination of column pairs in the database tables. This is undesirable, as joins are both time and resource intensive for a single join, let alone the numerous joins that are required by this approach. For example, if a first database table had 20 columns and a second database table had 18 columns, then in order to identify any inclusion dependencies, a join must be performed 1406 times (the number of permutations is equal to P (37,2)), which is very time and resource intensive for database tables with a lot of rows.

Other approaches towards identifying inclusion dependencies involve the use of minimum and maximum values. To illustrate, if one seeks to determine whether column A has an inclusion dependency with column B, and the minimum values and maximum values of column A and column B are known, then the nonexistence of an inclusion dependency between column A and column B may be verified if either the minimum value of column A is lower than the minimum value of column B or if the maximum value of column A is higher than the maximum value of column B. If the nonexistence of an inclusion dependency between column pairs can be identified, then the column pair may be eliminated from the potential set of column pairs to test for an inclusion dependency.

Transitive properties of exact inclusion dependencies state that if X $\subseteq$ Y, and Y $\subseteq$ Z, then X $\subseteq$ Z. Transitive properties may be used to assist the identification of exact inclusion dependencies. However, transitive properties do not work with approximate inclusion dependencies. For example, consider columns A, B, and C which contain the following values:

A: $\{1, \ldots, 10\}$
B: $\{1, \ldots, 8, 11, \ldots, 80\}$
C: $\{17, \ldots, 96\}$ Note that A $\subseteq$ B 80% of the time (i.e., 80% of the values in column A are in column B), and B $\subseteq$ C 80% of the time, but A $\subseteq$ C 0% of the time. Clearly, transitive properties do not work for approximate inclusion dependencies.

Unfortunately, in order to determine whether an inclusion dependency exists between columns of tables in a database, a join still must be performed on the database tables. Further, the joins may be performed on database tables storing large string values or other data types that require increased time and resources to process. Moreover, defining indexes on all the columns of the database tables to be joined is impractical, which further impedes the efficient performance of the join.

Consequently, there is a need in the art to discover approximate and exact unary inclusion dependencies without incurring the disadvantageous of the approaches described above. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments disclosed herein. It will be apparent, however, that the embodiments disclosed herein may be practiced without these specific details. In other instances, well-known structures and devices are shown in block diagram form in order to avoid unnecessarily obscuring the embodiments disclosed herein.

Functional Overview

An approach for analyzing potential inclusion dependencies between columns of database tables is described. According to an embodiment, a user associated with a client may cause a database server to transmit a command to a database. The command may be implemented using a Structured Query Language (SQL). The command is processed by the database server without the performance of a join on data stored in tables of a database. In response, result data is transmitted from the database server to the client. The result data may indicate any exact inclusion dependencies or approximate inclusion dependencies between columns of the database tables identified in the command.

In an embodiment, in the performance of processing the command, a count value that reflects how many times the value appears in each column of the set of columns is determined for each value in every column of a set of columns identified in the command.

Next, a first set of values is determined that reflects how many values are shared by each unique combination of column pairs. Each column in the unique combination of column pairs is in the set of columns identified in the command. Subsequently, a second set of values is determined that reflects a sum of count values associated with the first column for all values that are in both the first column and the second column. A count value is a number of times a particular value appears in a particular column.

Using the first set of values and the second set of values, the inclusion dependencies of the columns of database tables may be analyzed. In an embodiment, a determination of whether the first column has an exact inclusion dependency on the second column may be performed by dividing a specific value in the second set of values associated with the first column by the number of rows in the first column. If the specific value in the second set of values associated with the first column is equal to the number of rows in the first column, then the first database column has an exact inclusion dependency on the second database column.

In an embodiment, the percentage of values in the first column that are also present in the second column may be determined by dividing a specific value in the second set of values associated with the first column by the number of rows in the first column. This embodiment advantageously provides a mechanism to determine how strong an approximate inclusion dependency is that is shared between database columns.

Other embodiments are disclosed herein.

Architecture Overview

Figure 1:
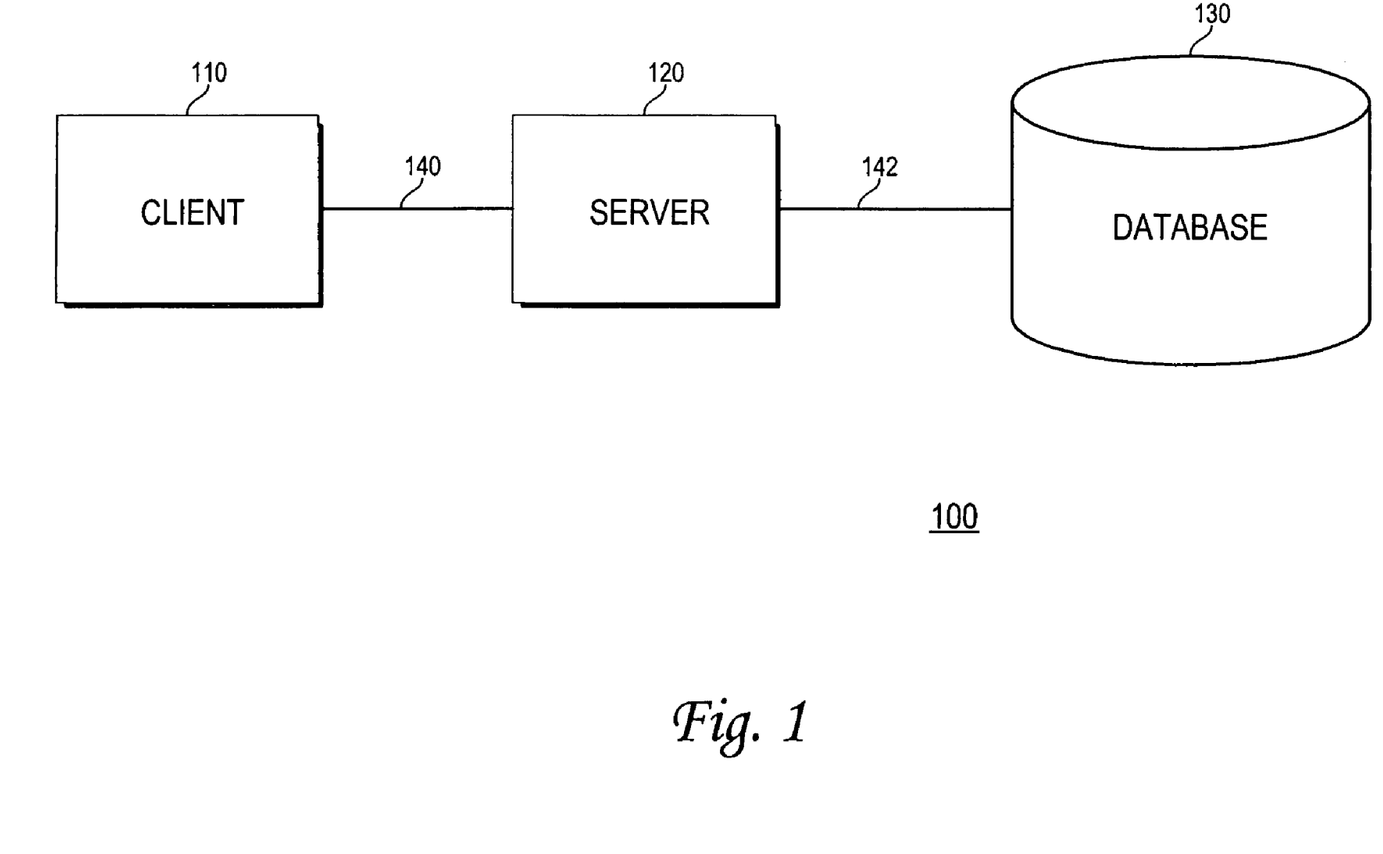
FIG. 1 is block diagram illustrating a system according to an embodiment.

FIG. 1 is block diagram illustrating a system 100 according to an embodiment. System 100 may be employed to analyze a potential inclusion dependency between columns of database tables in a database. In an embodiment, system 100 includes a client, a database server, a database, and communications links.

A client, such as client 110, may be implemented using any medium or mechanism that provides for issuing a database command to a database and viewing response data that reflects the result of processing the database command in the database. Client 110 may be implemented in software, e.g., a database application, or in hardware, e.g., an ASIC. While only one client is depicted in FIG. 1 for ease of explanation, other embodiments may comprise two or more clients. Consequently, database server 120 may communicate with any number of clients over communications link 140. A user, such as a database administrator, may use client 110 to issue database commands to database 130 to analyze a potential inclusion dependency between columns of database tables in database 130.

A database server, such as database server 120, may be implemented using any medium or mechanism that is capable of reading or write data to database 130. While only one database server 120 is depicted in FIG. 1 for ease of explanation, embodiments may comprise two or more database servers 120. Database server 120 may be implemented on the same computer system as database 130 (not shown), or may be implemented on a different computer system as database 130 (as illustrated in FIG. 1).

A database, such as database 130, may be implemented using any medium or mechanism for persistently storing data. Non-limiting, illustrative examples of database 130 include, a relational database, an object-oriented database, and a multi-dimensional database. While only one database 130 is depicted in FIG. 1 for ease of explanation, embodiments may comprise two or more databases 130.

Communications link 140 may be implemented by any medium or mechanism that provides for the exchange of data between client 110 and database server 120. Communications link 142 may be implemented by any medium or mechanism that provides for the exchange of data between database server 120 and database 130. Examples of communications links 140 and 142 include, without limitation, a network such as a Local Area Network (LAN), Wide Area Network (WAN), Ethernet or the Internet, or one or more terrestrial, satellite or wireless links.

Inclusion Dependency Analysis

Figure 2:
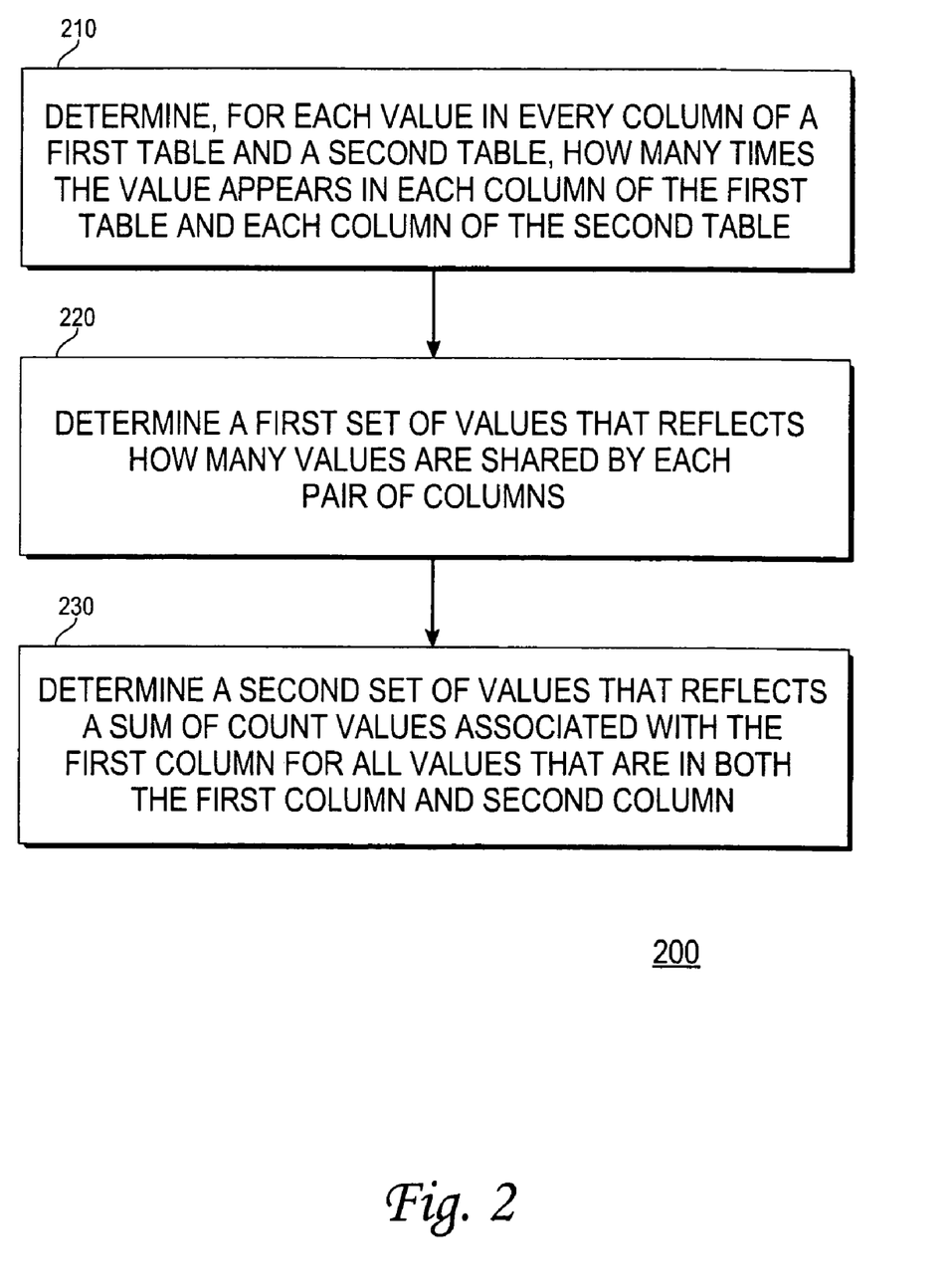
FIG. 2 is a flowchart illustrating the functional steps performed by an embodiment.

FIG. 2 is a flowchart 200 illustrating the functional steps performed by an embodiment. By performing the steps illustrated in FIG. 2, the potential inclusion dependencies of columns of database tables may be analyzed. The steps of FIG. 2 enable a more efficient analysis over prior approaches in that the approach taken by embodiments described herein does not involve any joins in the identification of any exact inclusion dependencies or the percentage of rows that an approximate inclusion dependency holds. Further, the approach of embodiments described herein converts all values of database tables being analyzed into integer representations, which require fewer resources to process. Moreover, the approach taken by embodiments analyzes data contained in a single table containing purely integer values, which facilitates the use of an index on a column of that table to promote efficiency. As described in further detail below, embodiments need only perform one pass on the data to determine potential inclusion dependencies between columns of database tables, which furthers the efficiency of the embodiments over prior approaches.

To facilitate the ease of explanation of the steps of FIG. 2, each step shall be discussed with reference to analyzing two exemplary database tables of database 130 entitled T1 and T2. The steps of FIG. 2 shall be explained below with reference to analyzing the existence of any inclusion dependencies between T1 and T2. Table T1 has two columns, namely C1 and C2, and T2 also has two columns, namely C3 and C4. T1 and T2 are illustrated below:

TABLE T1

| C1 | C2 |
|----|----|
| a  | a  |
| a  | b  |
| g  | d  |
| c  | c  |

TABLE T2

| C3 | C4 |
|----|----|
| c  | c  |
| c  | d  |
| d  | F  |
| e  | E  |
| f  | E  |
| d  | G  |

Each of the steps of FIG. 2 may be performed in response to server 120 receiving one or more commands, such as a SQL statement. A user associated with client 110 may issue a command from client 110 to database server 120 to cause database server 120 to perform operations against database 130. Likewise, the result of processing the command against database 130 may be communicated to client 110 by database server 120.

In an embodiment, the steps of FIG. 2 may be performed by the SQL statement illustrated in Appendix A. Note that the SQL statement of Appendix A is merely an illustration of one embodiment; other embodiments may perform the steps of FIG. 2 using different SQL statements or through the performance of an entirely different mechanism altogether.

To illustrate an embodiment of the invention, the steps of FIG. 2 shall be described with reference to analyzing the potential inclusion dependencies between columns of T1 and T2. In step 210, a determination is made, for each value in every column of a first table and a second table, of how many times the value appears in each column of the first table and each column of the second table. For example, in the illustrative tables T1 and T2 shown above, in step 210, a determination is made, for each value in columns C1, C2, C3, and C4, of how many times the value appears in each column of T1 and T2.

In an embodiment, step 210 may be accomplished by performing the steps described below with reference to Examples 1-4. In the performance of step 210 according to an embodiment, the union of all the columns in T1 and T2 is obtained, and thereafter each value of the union is associated with a column identifier, as shown below in Example 1:

EXAMPLE 1

| COLUMN IDENTIFIER | VALUE |
|-------------------|-------|
| 1 | a |
| 1 | a |
| 1 | g |
| 1 | c |
| 2 | a |
| 2 | b |
| 2 | d |
| 2 | c |
| 3 | c |
| 3 | c |
| 3 | d |
| 3 | e |
| 3 | f |
| 3 | d |
| 4 | c |
| 4 | d |
| 4 | f |

-continued

| COLUMN IDENTIFIER | VALUE |
|-------------------|-------|
| 4 | e |
| 4 | e |
| 4 | g |

The column identifier may be any value that identifies a particular column of a table being analyzed by an embodiment. In the above example, column C1 is assigned a column identifier of "1," column C2 is assigned a column identifier of "2," column C3 is assigned a column identifier of "3," and column C4 is assigned a column identifier of "4." Column of tables being analyzed by an embodiment may be assigned column identifiers in any order, i.e., the only requirement is that the column identifier uniquely identifies the particular column.

The table of Example 1 thus lists all the column identifiers of tables being analyzed by an embodiment in one column, along with their corresponding values in another column, Thus, the first four values in the value column of the table of Example 1 correspond to the values of C1, the next four values in the value column of the table of Example 1 correspond to the values of C2, the next six values in the value column of the table of Example 1 correspond to the values of C3, and the last six values in the value column of the table of Example 1 correspond to the values of C4.

After the table of Example 1 is generated, each value appearing in the table of Example 1 may be assigned a value identifier, which is any value that uniquely identifies a particular value appearing in the union of the tables being analyzed. Example 2 illustrates value identifiers for the table of Example 1.

EXAMPLE 2

A=1
G=2
C=3
B=4
D=5
E=6
F=7

After value identifiers have been assigned to each value appearing in the table of Example 1, a new table is generated based on the table of Example 1. The new table includes the column identifier, the value identifier, and a count, as shown below in Example 3. The count reflects the number of times a particular value identified by a value identifier appears in a particular column identified by a column identifier. Each row in the table of Example 3 corresponds to a row in the table of Example 1, although the order of the rows has changed from being ordered by column identifier to being ordered by value identifier. Note that the order of rows in the table of Example 1 or Example 3 is not important.

EXAMPLE 3

| COLUMN IDENTIFIER | VALUE IDENTIFIER | COUNT |
|-------------------|------------------|-------|
| 1 | 1 | 2 |
| 1 | 1 | 2 |
| 2 | 1 | 1 |

-continued

| COLUMN IDENTIFIER | VALUE IDENTIFIER | COUNT |
|---|---|---|
| 1 | 2 | 1 |
| 4 | 2 | 1 |
| 1 | 3 | 1 |
| 2 | 3 | 1 |
| 3 | 3 | 2 |
| 3 | 3 | 2 |
| 4 | 3 | 1 |
| 2 | 4 | 1 |
| 2 | 5 | 1 |
| 3 | 5 | 2 |
| 3 | 5 | 2 |
| 4 | 5 | 1 |
| 3 | 6 | 1 |
| 4 | 6 | 2 |
| 4 | 6 | 2 |
| 3 | 7 | 1 |
| 4 | 7 | 1 |

For example, the first row of Example 3 (which corresponds to the first row of the table of Example 1) describes that there are two values in the column associated with a column identifier of 1 (column C1) that have a value associated with a value identifier of 1 (namely, the value "A"). The last row of Example 3 (which corresponds to the seventeenth row of the table of Example 1) describes that there is one value in the column associated with a column identifier of 4 (column C4) that has a value associated with a value identifier of 7 (namely the value "F").

In an embodiment, the table of Example 3 may be created using the partition feature of a database system.

One or more rows in the table of Example 3 may contain duplicate information. Any row that contains the same values in each column as a previous row may be eliminated. Example 4 illustrates the table of Example 3 with all duplicate rows eliminated.

EXAMPLE 4

| COLUMN IDENTIFIER | VALUE IDENTIFIER | COUNT |
|---|---|---|
| 1 | 1 | 2 |
| 2 | 1 | 1 |
| 1 | 2 | 1 |
| 4 | 2 | 1 |
| 1 | 3 | 1 |
| 2 | 3 | 1 |
| 3 | 3 | 2 |
| 4 | 3 | 1 |
| 2 | 4 | 1 |
| 2 | 5 | 1 |
| 3 | 5 | 2 |
| 4 | 5 | 1 |
| 3 | 6 | 1 |
| 4 | 6 | 2 |
| 3 | 7 | 1 |
| 4 | 7 | 1 |

The table illustrated in Example 4 describes, for each value in every column of T1 and T2, how many times the value appears in each column of T1 and T2. The table of Example 4 may be created in response to the processing of a SQL statement without the performance of a join. After the performance of step 210, processing proceeds to step 220.

In step 220, a first set of values that reflect how many values are shared by each unique combination of column pairs is determined. In an embodiment, step 220 may be accomplished by performing the steps described below with reference to the creation of the table of Example 5. Table 5 may be created by server 120 as a result of processing a database command, e.g., a SQL statement.

EXAMPLE 5

| LHS | RHS | VALUE IDENTIFIER COUNT | SUM OF COUNT OF LHS IN EACH GROUP |
|---|---|---|---|
| 1 | 1 | 3 | X |
| 1 | 2 | 2 | 3 |
| 1 | 3 | 1 | 1 |
| 1 | 4 | 2 | 2 |
| 2 | 1 | 2 | 2 |
| 2 | 2 | 4 | X |
| 2 | 3 | 2 | 2 |
| 2 | 4 | 2 | 2 |
| 3 | 1 | 1 | 2 |
| 3 | 2 | 2 | 4 |
| 3 | 3 | 4 | X |
| 3 | 4 | 4 | 6 |
| 4 | 1 | 2 | 2 |
| 4 | 2 | 2 | 2 |
| 4 | 3 | 4 | 5 |
| 4 | 4 | 5 | X |

As shown above, the table of Example 5 has four columns. A first column is entitled "LHS," which refers to a column on the "left hand side" of an inclusion dependency relationship. For example, for an inclusion dependency relationship T1.C1 ⊆ T2.C2, T1.C1 is on the left hand side. On the other hand, another column in the table of Example 5 is entitled "RHS," which refers to a column on the "right hand side" of an inclusion dependency relationship. For example, for an inclusion dependency relationship T1.C1 ⊆ T2.C2, T2.C2 is on the right hand side. The values of the column of LHS and RHS in the table of Example 5 are created such that all possible unique pairs of columns in the database tables being analyzed are represented. In other words, each row of the table of Example 5 refers to a unique combination of columns of either T1 or T2, and every unique combination of columns in either T1 or T2 is represented by a row in the table of Example 5.

In an embodiment, the column of the table of Example 5 entitled "value identifier count" corresponds to the first set of values that reflect how many values are shared by each unique combination of column pairs. In other words, the integer values in the column entitled "value identifier count" identify how many values are shared by the combination of column pairs identified by the LHS and RHS values of the row. For example, the second row of the table of Example 5 indicates that the column associated with the column identifier of 1 and the column associated with the column identifier of 2 share 2 values, and the fifteenth row of the table of Example 5 indicates that the column associated with the column identifier of 4 and the column associated with the column identifier of 3 share 4 values.

Values in the column of the table of Example 5 entitled "value identifier count" may be populated by determining, for each combination of columns identified by the LHS and the RHS values associated with the row, how many values those columns have in common. After the performance of step 220, processing proceeds to step 230.

In step 230, a second set of values that reflect a sum of count values associated with the first column for all values that are in both the first column and the second column is determined. In an embodiment, the column of the table of Example 5 entitled "Sum Of Count Of LHS in each Group" corresponds to the second set of values that reflect a sum of count values associated with the first column (the column entitled "LHS") for all values that are in both the first column (the column associated with the column identifier in the "LHS" column) and the second column (the column associated with the column identifier in the "RHS" column). In other words, the integer values in each row of the column entitled "Sum Of Count Of LHS in each Group" identify the sum of count values associated with the column associated with the column identifier in the LHS column in that row for all values that are in both the column associated with the column identifier in the LHS column in that row and the column associated with the column identifier in the RHS column in that row.

For example, the value in the column entitled "Sum Of Count Of LHS in each Group" in the second row is "3," which is equal to the sum of the count values listed in the table of Example 4 that are associated with the column identifier listed in the LHS column in the second row, for each value that appears in both the column identified in the LHS column and the RHS column. The value "A" and "C" both appear in the columns identified in second row of the LHS column and the RHS column. The count values associated with the LHS column for these values in the table of Example 4 are "2" and "1" respectively; consequently, the sum of these two values is "3," which corresponds to the value in the column entitled "Sum Of Count Of LHS in each Group" in the second row.

Several values in the column entitled "Sum Of Count Of LHS in each Group" in the table illustrated above are "X." The value of "X" in this column signifies that the column identified in the LHS column and the RHS column for that row are the same column. Step 230 is not performed on a single column, i.e., for the row in the column entitled "Sum Of Count Of LHS in each Group" to have a value, the columns identified in the LHS column and the RHS column for that row must be different.

The table created above in Example 5 may be employed to discover the inclusion dependencies of the tables being analyzed. The process of discovering the inclusion dependencies of the tables being analyzed is discussed in further detail below in the section entitled "Discovering Exact and Approximate Inclusion Dependencies."

The steps described above with reference to FIG. 2 may be performed on any number of tables. In other words, while the example above involved two sample tables, other embodiments may analyze the potential inclusion dependencies between columns of any number of database tables.

Note that the functional steps of FIG. 2 are performed without the performance of a join of any tables in database 130. Further, the values of tables being analyzed are converted into integer representations. The integer representations, rather than the original values of the database tables, are processed according to embodiments. Processing integer representations, rather than the original values in the database tables (which could be, for example, long string values) requires fewer resources to process.

Moreover, the approach described above determined inclusion dependencies by analyzing data contained in a single table containing purely integer values. Thus, an index could be easily employed on one or more columns of the single table to promote efficiency. Note that embodiments need only perform one pass on the data to determine potential inclusion dependency between columns of database tables, which further promotes the efficiency of the embodiments over prior approaches.

After the information reflected in the table of Example 5 is generated, the exact and approximate inclusion dependencies may be discovered, as explained below. Note that the table of Example 5 is merely illustrative; the information described by the table of Example 5 may be expressed using a variety of different mechanisms and formats.

Discovering Exact and Approximate Inclusion Dependencies

The exact and approximate inclusion dependencies between columns of database tables being analyzed may be determined by examining the information described by the table of Example 5. To facilitate the below discussion, the column of the table of Example 5 entitled "value identifier count" shall be abbreviated "VIC", while the column entitled "Sum of Count of LHS in each Group" shall be abbreviated "SOC."

The existence of an exact inclusion dependency between two columns may be determined by the expression:

if $VIC(i,j)=VIC(i,i)$, then $LHS(i) \subseteq RHS(j)$ where "i" refers to a column identifier in the LHS column and "j" refers a column identifier in the RHS column.

For example, to determine whether an exact inclusion dependency relationship exists between C3 of Table T2 (which is associated with column identifier of 3) and C4 of Table T2 (which is associated with column identifier of 4), the determination may be expressed as:

if $VIC(3,4)=VIC(3,3)$, then $LHS(3) \subseteq RHS(4)$ $VIC(3,4)=4$ because the value in the VIC column for the row in which the LHS column has a value of 3 and the RHS column has a value of 4 is 4. $VIC(3,3)=4$ because the value in the VIC column for the row in which the LHS column has a value of 3 and the RHS column has a value of 3 is 4. Thus, the expression $VIC(3,4)=VIC(3,3)$ is true, as both sides of the equation are equal to 4. Consequently, the column associated with column identifier 3 $\subseteq$ the column associated with column identifier 4, or said differently:

T2.C1 $\subseteq$ T2.C2

In another example, to determine whether an exact inclusion dependency exists between T1.C1 (associated with column identifier 1) and T2.C2 (associated with column identifier 3), the determination may be expressed as:

if $VIC(1,3)=VIC(1,1)$, then $LHS(1) \subseteq RHS(3)$

In this case, $VIC(1,3)=1$ and $VIC(1,1)=3$. Consequently, $VIC(1,3) \neq VIC(1,1)$, so there does not exist an exact inclusion dependency between T1.C1 and T2.C2.

The percentage that an approximate inclusion dependency exists between two column of database tables being analyzed may be determined by the expression:

$LHS(i) \subseteq RHS(j)$ holds for $SOC(i,j)/n(i)$ where $n(i)$ is equal to the number of rows in the column associated with the column identifier of i.

For example, the approximate inclusion dependency of column T1.C1 associated with column identifier 1) and T1.C2 with column identifier 2) holds for 75% of the time, because 3 is the value in the SOC column for the row in which (1) the value in the LHS column is 1 and, (2) the value in the RHS column is 2, and there are four rows in the column associated with the column identifier of 1 (T1.C1). Thus, ¾=75%. If one were to look at the original values in the columns C1 and C2 of table T1, one will see that three of the four values in C1 are in C2 (only the value of g is in C1 and not in C2).

Both of the approaches discussed above with respect to determining the existence of an exact inclusion dependency between columns and the percentage that an approximate inclusion dependency exists between columns may be implemented using database commands transmitted to server 120. For example, a SQL statement processed by server 120 may perform the approaches discussed above with respect to determining the existence of an exact inclusion dependency between database columns of database tables maintained by database 130 and the percentage that an approximate inclusion dependency exists between database columns of database tables maintained in database 130.

In response to processing a SQL statement that determines whether an exact inclusion dependency exists or the percentage that an approximate inclusion dependency holds, server 120 may generate result data. The result data may indicate information about any exact inclusion dependencies or approximate inclusion dependencies between columns of the database tables. Server 120 may transmit the result data to client 110. The result data may then be displayed on client 110 to a user of client 110.

Orphan Calculation

An orphan value is a value that is present in a first column but not present in a second column. Once the approximate inclusion dependency is determined for a combination of columns, the orphan values may be identified and the rows in which those orphans values are stored may be identified. The SQL statement of Example 6 returns the orphan values.

EXAMPLE 6 select value, c from (select
g, value, count(s) over (partition by g) c from
(select s, g value from fkpart_number where cid in (x,y))) v
where c=1 and cid=x In the SQL statement illustrated in Example 6, "x" is the column that contains the orphan value and "y" is the column that does not contain the orphan value.

Once all the orphan values are identified, all the rows in the database column that store the orphan values may be retrieved using a database command, e.g., a set of SQL statements.

Retrieving the orphan values and rows containing orphan values is advantageous because it allows an administrator to perform data profiling analysis on the data stored within the database tables.

Redundant Column Calculation

Once the potential inclusion dependencies existing among database columns are analyzed, e.g., by generated the table of Example 5, additional analysis may be performed to determine if any columns are redundant. A redundant column is a column that may be removed from the analyzed set of columns, and may subsequently be recreated based on the remaining information in columns of the analyzed set.

Figure 3:
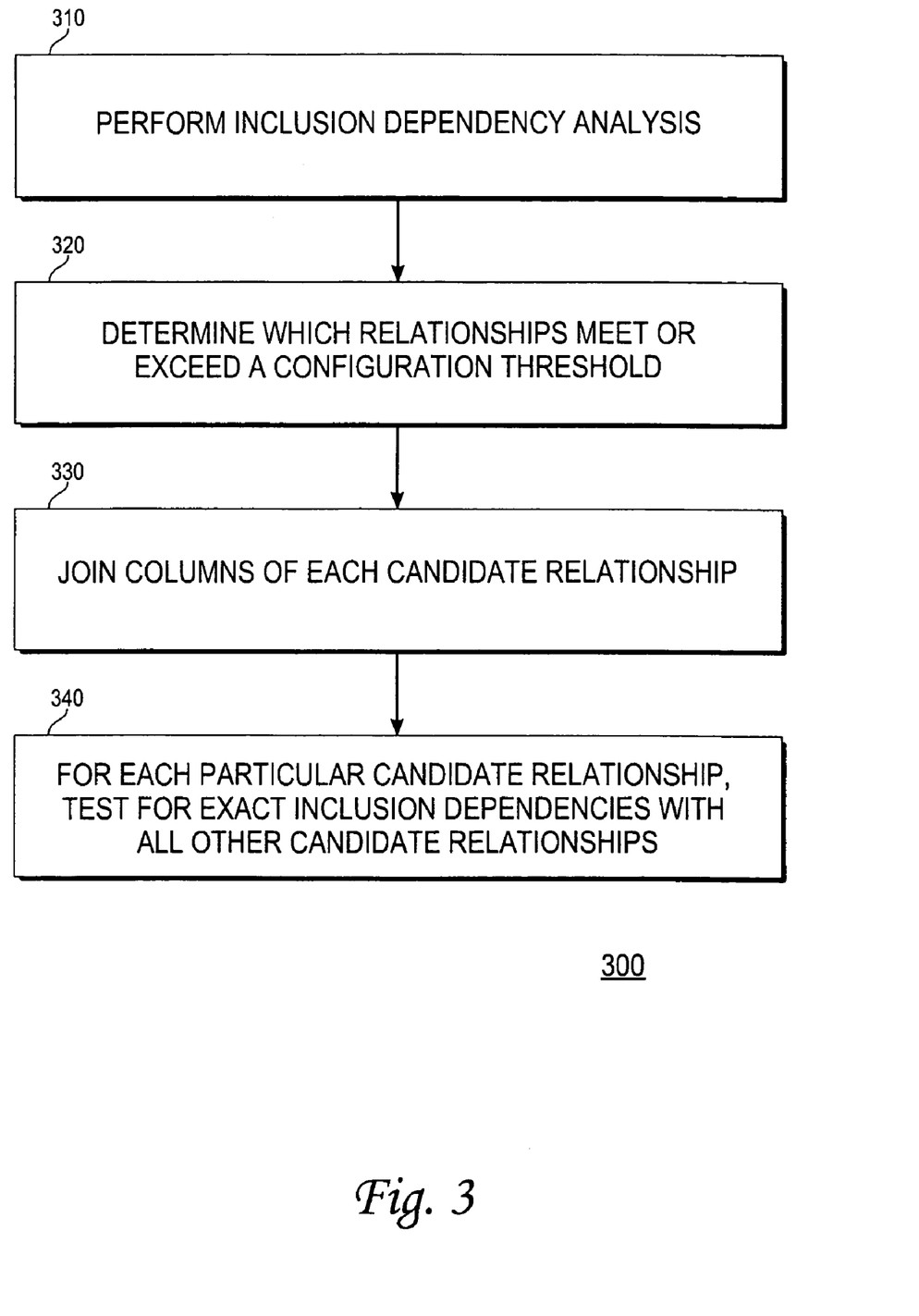
FIG. 3 is a flowchart illustrating the functional steps of determining whether a column is redundant according to an embodiment.

FIG. 3 is a flowchart illustrating the functional steps of determining whether a column is redundant according to an embodiment. By performing the steps illustrated in FIG. 3, a database administrator may determine whether one or more columns of a set of database tables is redundant. In step 310, inclusion dependency analysis is performed to identify the inclusion dependencies among columns of a plurality of database tables. In an embodiment, the inclusion dependency analysis of step 310 may be performed by the steps illustrated in FIG. 2, as explained above. Consequently, after the performance of step 310, information about the inclusion dependencies of columns of database tables is available, such as the information presented in the table of Example 5. After the performance of step 310, processing proceeds to step 320.

In step 320, the approximate inclusion dependency relationships identified in step 310 that meet or exceed a configurable threshold are determined. All exact inclusion dependency relationships identified in step 310 are considered potential candidates to contain a redundant column; however, an approximate inclusion dependency relationship may only be considered to be a potential candidate to contain a redundant column if the approximate inclusion dependency is strong enough, i.e., the percentage that the approximate inclusion dependency exists exceeds the configurable threshold.

For example, consider the following inclusion dependency relationships along with the percentage of rows in which each inclusion dependency holds:

$C1 \subseteq C4$—100%
$C3 \subseteq C5$—85%
$C2 \subseteq C6$—25%

If the performance of step 310 yielded the above results, and if the configurable threshold is 85%, then the inclusion dependency relationships $C1 \subseteq C4$ and $C3 \subseteq C5$ will be chosen as candidates for containing a redundant column. The configurable threshold may be established by a database administrator. Step 320 may be performed manually or automatically, e.g., using a database command such as a SQL statement. After the performance of step 320, processing proceeds to step 330.

In step 330, for each candidate relationship determined in step 320, a join of the columns associated with a particular candidate relationship is performed. Thus, if the candidate relationships of $C1 \subseteq C4$ and $C3 \subseteq C5$ are identified in step 320, then two joins are performed in step 330, namely the join of the C1 and C4 and the join of C3 and C5. After the performance of step 330, processing proceeds to step 340.

In step 340, for each join performed in step 330, a test for the presence of an exact inclusion dependency between the dataset associated with the join and the columns associated with any other candidate relationships determined in step 320 is performed. The test for the presence of an exact inclusion dependency may be performed using the approaches described in the section entitled "Discovering Exact and Approximate Inclusion Dependencies." If an exact inclusion dependency between the dataset associated with the join and a particular column of a particular candidate relationship is found, then that particular column is a redundant column. After the identification of a redundant column, a database administrator may take any appropriate action, e.g., the database administrator may eliminate the redundant column.

In an embodiment, a SQL statement that performs additional analysis on the information provided by the table of Example 5 may be processed by database 130 to determine one or more redundant columns. In other words, every step of FIG. 3 may be embodied in a SQL statement. For example, the SQL statement of Example 7 performs additional analysis on the information provided by the table of Example 5 to determine one or more redundant columns.

EXAMPLE 7

```
with 1c as
(
select b.cid, b.seq_id, b.value from
(
select cid, value from
(
select cid, value, count(s) over (partition by g) c from
(
select s, g, cid, value from fkpart
where cid in (:indLHS,:indRHS)
)
) where c > 1
) a, fkpartition_number b
where a.value = b.value and a.cid = b.cid)
select count(1) from
(
select rank ( ) over (partition by g.seq_id order by h.seq_id) rank from
(
select e.value value1, e.seq_id from fkpartition_number
e where e.cid = :c1 and exists
(
select 1 from 1c l where cid = :indLHS and l.seq_id = e.seq_id
)
) g,
(
select f.value value2, f.sseq_id from fkpartition_number
f where f.cid = :c2 and exists
(
select 1 from lc l where cid = :indRHS and l.seq_id = f.seq_id
)
) h where value1 = value2
) where rank = 1
```

Note that in the above SQL statement, the expression ":indLHS" is a reference to a set of rows that belong to columns of the join condition on the LHS column, the expression ":indRHS" is a reference to a set of rows that belong to columns of the join condition on the RHS column, and "seq_id" refers to the current position in the row set.

Implementing Mechanisms

Figure 4:
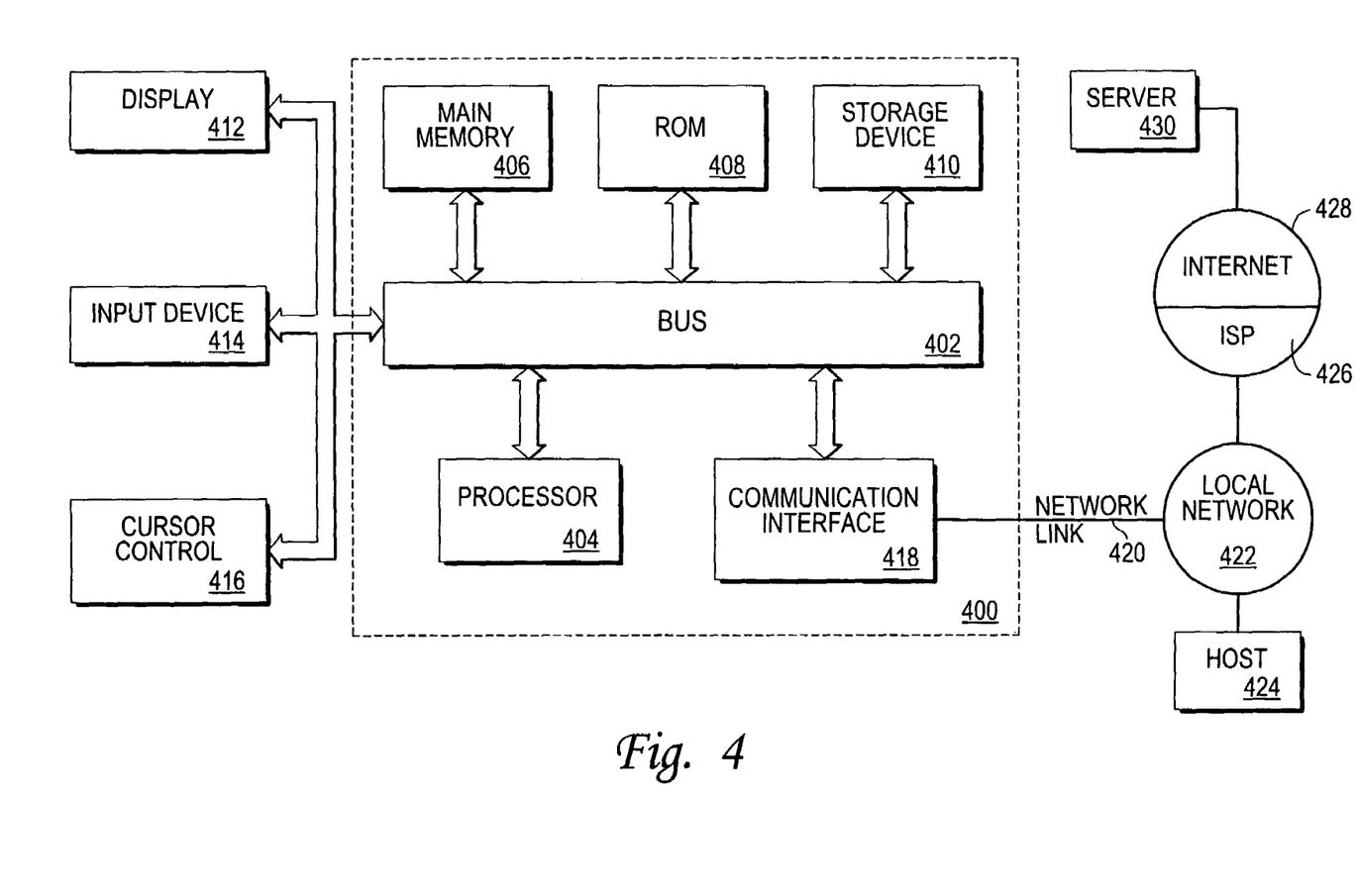
FIG. 4 is a block diagram that illustrates a computer system upon which an embodiment may be implemented.

In an embodiment, client 110, database server 120, and database 130 may each be implemented on a computer system. FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

The exemplary SQL statement illustrated in Appendix A performs the functional steps illustrated in FIG. 2.

```
select v.s1, v.tid 1, v.cid 1, v.s2, v.tid2, v.cid2,
(
  select sum (t1.cnt)
  from fkpart_number t1
  where exists (select 1
    from fkpart_number t2
```

-continued

```
    where t2.g = t1.g
    and t2.s = v.s2)
  and t1.s = v.s1
) difference,
(
  select count (distinct t1.g)
  from fkpart_number t1
  where exists (select 1
    from fkpart_number t2
    where t2.g = t1.g
    and t2.s = v.s2)
  and t1.s = v.s1
) num_common_groups from
(
  select distinct t3.s s1, t3.cid cid 1, t3.tid tid1,
  t4.s s2, t4.cid cid2, t4.tid tid2
  from fkpart_number t3, fkpart_number t4
  where t3.g = t4.g
) v
```

What is claimed is:

1. A machine-implemented method for determining whether an inclusion dependency exists between a first column and a second column, comprising:
    determining, for each value in the first column, a count value that identifies how many times the value appears in the first column;
    determining which values are shared by the first column and the second column;
    determining a sum of count values for all values that are shared by the first column and the second column;
    performing a comparison between the sum and the number of rows in the first column;
    determining whether the inclusion dependency exists between the first column and the second column based on said comparison;
    wherein performing said comparison includes determining a percentage by dividing the sum by the number of rows;
    wherein determining whether the inclusion dependency exists is based on said percentage; and
    transmitting result data that indicates whether the inclusion dependency exists.

2. The method of claim 1, wherein the first column is a column of a first table and wherein the second column is a column of a second table.

3. The method of claim 1, wherein the first column is a column of a first table, wherein the second column is a column of a second table, and wherein the step of determining which values are shared by the first column and the second column and the step of determining the sum are both performed without performing a join on the first table and the second table.

4. The method of claim 1, further comprising:
    determining whether an exact inclusion dependency exists based on a whether the percentage is 100%.

5. The method of claim 1, further comprising:
    determining whether an approximate inclusion dependency exists based on whether the percentage exceeds a specified threshold.

6. The method of claim 1, further comprising:
    converting each original value in the first column and the second column to integer representations that correspond to the original value.

7. The method of claim 1, further comprising:
    determining how many distinct values are present in the first column but not present in the second column.

8. The method of claim 1, wherein the first column is a column of a first table, wherein the second column is a column of a second table, and wherein the method further comprises:
retrieving any row in the first table that contains a value that is present in the first column but not present in the second column.

9. The method of claim 1, further comprising:
determining a set of column pairs that share an inclusion dependency that meets or exceeds a configurable threshold; and
determining whether each column pair in the set of column pairs that shares an inclusion dependency that meets or exceeds the configurable threshold contains a redundant column.

10. A machine-readable storage medium carrying one or more sequences of instructions for determining whether an inclusion dependency exists between a first column and a second column, wherein execution of the one or more sequences of instructions by one or more processors causes the one or more processors to perform the steps of:
determining, for each value in the first column, a count value that identifies how many times the value appears in the first column;
determining which values are shared by the first column and the second column;
determining a sum of count values for all values that are shared by the first column and the second column;
performing a comparison between the sum and the number of rows in the first column;
determining whether the inclusion dependency exists between the first column and the second column based on said comparison;
wherein performing said comparison includes determining a percentage by dividing the sum by the number of rows;
wherein determining whether the inclusion dependency exists is based on said percentage; and
transmitting result data that indicates whether the inclusion dependency exists.

11. The machine-readable storage medium of claim 10, wherein the first column is a column of a first table and wherein the second column is a column of a second table.

12. The machine-readable storage medium of claim 10, wherein the first column is a column of a first table, wherein the second column is a column of a second table, and wherein the step of determining which values are shared by the first column and the second column and the step of determining the sum are both performed without performing a join on the first table and the second table.

13. The machine-readable storage medium of claim 10, wherein execution of the one or more sequences of instructions by the one or more processors causes the one or more processors to further perform the step of:
determining whether an exact inclusion dependency exists based on whether the percentage is 100%.

14. The machine-readable storage medium of claim 10, wherein execution of the one or more sequences of instructions by the one or more processors causes the one or more processors to further perform the step of:
determining whether an approximate inclusion dependency exists based on whether the percentage exceeds a specified threshold.

15. The machine-readable storage medium of claim 10, wherein execution of the one or more sequences of instructions by the one or more processors causes the one or more processors to further perform the step of:
converting each original value in the first column and the second column to integer representations that correspond to the original value.

16. The machine-readable storage medium of claim 10, wherein execution of the one or more sequences of instructions by the one or more processors causes the one or more processors to further perform the step of:
determining how many distinct values are present in the first column but not present in the second column.

17. The machine-readable storage medium of claim 10, wherein the first column is a column of a first table, wherein the second column is a column of a second table, and wherein execution of the one or more sequences of instructions by the one or more processors causes the one or more processors to further perform the step of: retrieving any row in the first table that contains a value that is present in the first column but not present in the second column.

18. The machine-readable storage medium of claim 10, wherein execution of the one or more sequences of instructions by the one or more processors causes the one or more processors to further perform the steps of:
determining a set of column pairs that share an inclusion dependency that meets or exceeds a configurable threshold; and
determining whether each column pair in the set of column pairs that shares an inclusion dependency that meets or exceeds the configurable threshold contains a redundant column.

19. The method of claim 1, further comprising:
determining a value identifier count that identifies how many values are shared by the first column and the second column.

20. The method of claim 19, further comprising:
determining whether an exact inclusion dependency exists based on whether the value identifier count is equal to how many distinct values are in the first column.

21. The machine-readable storage medium of claim 10, wherein execution of the one or more sequences of instructions by the one or more processors causes the one or more processors to further perform the step of:
determining a value identifier count that identifies how many values are shared by the first column and the second column.

22. The machine-readable storage medium of claim 21, wherein execution of the one or more sequences of instructions by the one or more processors causes the one or more processors to further perform the step of:
determining whether an exact inclusion dependency exists based on whether the value identifier count is equal to how many distinct values are in the first column.

* * * * *

UNITED STATES PATENT AND TRADEMARK OFFICE
CERTIFICATE OF CORRECTION

| | |
|---|---|
| PATENT NO. | : 7,349,898 B2 |
| APPLICATION NO. | : 10/861298 |
| DATED | : March 25, 2008 |
| INVENTOR(S) | : Gonzalez |

It is certified that error appears in the above-identified patent and that said Letters Patent is hereby corrected as shown below:

In column 6, line 21, delete "column," and insert -- column. --, therefor.

In column 7, line 29, delete "namely" and insert -- namely, --, therefor.

In column 10, line 63, delete "associated" and insert -- (associated --, therefor.

In column 10, line 64, after "T1.C2" insert -- (associated --.

In column 16, line 56, in claim 4, after "on" delete "a".

Signed and Sealed this

Third Day of November, 2009

David J. Kappos
*Director of the United States Patent and Trademark Office*